(No Model.)

J. H. KIZER.
Fire-Place Fender.

No. 227,545. Patented May 11, 1880.

Attest.

Inventor.
James H. Kizer
by James H. Layman
his Attorney

UNITED STATES PATENT OFFICE.

JAMES H. KIZER, OF COVINGTON, KENTUCKY, ASSIGNOR OF ONE-HALF OF HIS RIGHT TO IVOR J. EVANS, OF SAME PLACE.

FIRE-PLACE FENDER.

SPECIFICATION forming part of Letters Patent No. 227,545, dated May 11, 1880.

Application filed March 25, 1880. (No model.)

*To all whom it may concern:*

Be it known that I, JAMES H. KIZER, of Covington, Kenton county, Kentucky, have invented certain new and useful Improvements in Fire-Place Fenders, of which the following is a specification.

My invention consists of a cheap, light, and handy clip or keeper, wherewith casters or small rollers may be readily applied to fire-place fenders, the peculiar construction of said clip being fully shown in the annexed drawings, in which—

Figure 1:
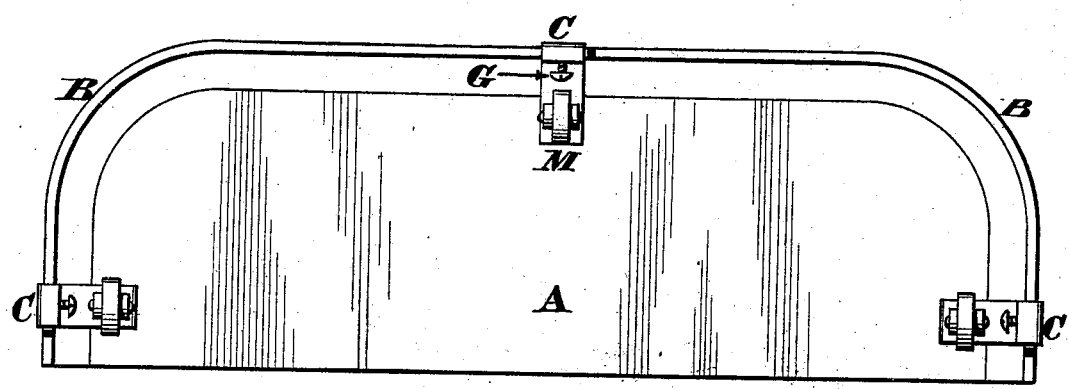
Figures 2, 3:
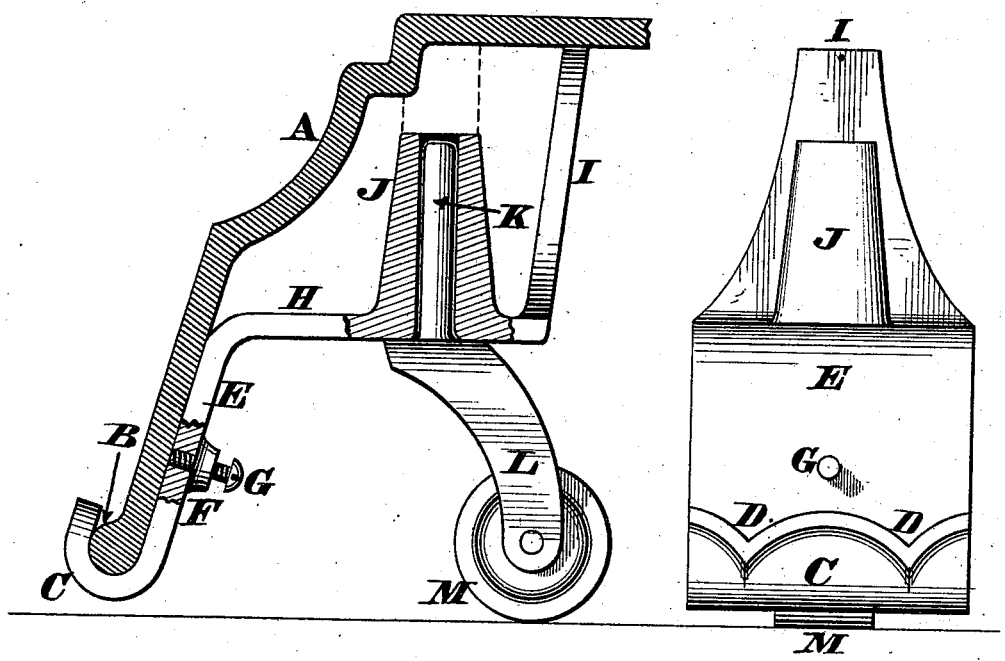

Figure 1 is a plan showing the under side of a fender provided with my clip attachments. Fig. 2 is an enlarged vertical section of the fender, taken in the plane of the caster-spindle. Fig. 3 is a front elevation of my clip detached from the fender.

Referring to Fig. 1, A represents any approved form of fire-place fender, and B is the bottom flange or rim of the same, which flange is snugly grasped by the upturned lip C of the clip, the exposed portion of this lip being ornamented in any suitable manner, as at D in Fig. 3. The aforesaid lip is the prolongation of a plate, E, that may be shaped so as to correspond with the general contour of the fender-front, a boss or swell, F, being made on the rear side of this plate to admit a screw, G, wherewith the clip is securely clamped to fender. Plate E is carried back about horizontally at H, and thence upwardly at I, which portion I fits closely under the fender-top, as seen in Fig. 2. Cast with or attached to plate H is a suitable bearing, J, for the spindle or stem K of a frame, L, within which latter is journaled a caster or small roller, M.

From the above description it will be perceived that by simply engaging the lip C around the flange B, and then tightening the screw G, the device will be readily attached to the fender, and in such a secure manner as to allow the latter to be wheeled from place to place without lifting it bodily.

By making the portions E, H, and I somewhat elastic the clip may be slightly bent, so as to adapt it to a great variety of fenders, which advantage cannot be obtained with those casters whose bearings are cast with the fenders. In some cases the upright member I may be omitted and the bearing J prolonged vertically, so as to rest under the top of the fender, as indicated by the dotted lines in Fig. 2. Finally, the exposed part D of the lip may be plated, so as to enhance the appearance of the fender.

I claim as my invention—

1. A detachable clip for fender-casters, which clip includes a retaining-lip, a clamping device, and a bearing for the spindle of the caster-frame, substantially as described.

2. A detachable fender-caster clip consisting of lip C, plates E H, clamping device G, spindle-bearing J, and caster K L M, substantially as described.

3. The combination, in a fender-caster clip, of lip C, plates E H, clamping device G, prop I, spindle-bearing J, and caster K L M, substantially as herein described.

In testimony of which invention I hereunto set my hand.

JAMES H. KIZER.

Witnesses:
JAMES H. LAYMAN,
IVOR J. EVANS.